United States Patent [19]
Kraft

[11] 3,783,363

[45] Jan. 1, 1974

[54] VARIABLE POWER ACTUATOR AND SWITCH THEREFOR

[75] Inventor: Arthur A. Kraft, Strongsville, Ohio
[73] Assignee: Vari-Systems, Inc., Cleveland, Ohio
[22] Filed: Mar. 23, 1972
[21] Appl. No.: 237,365

[52] U.S. Cl. ............................................... 318/481
[51] Int. Cl. .......................................... G05b 13/02
[58] Field of Search.....318/217–222, 481, 645, 672, 318/673

[56] References Cited
UNITED STATES PATENTS
2,053,885   9/1936   Weeks ........................... 318/481 X
2,549,265   4/1951   Trant .............................. 318/221 X
3,286,148   11/1966  Henderson ..................... 318/222 X Primary Examiner—Bernard A. Gilheany
Assistant Examiner—W. E. Duncanson, Jr.
Attorney—John W. Renner

[57] ABSTRACT

A variable rotary power actuator for modulating damper position in response to sensed pressure levels includes a solid state reversible motor drive having SCR's triggered by a switch monitoring diaphragm extension. The switch is adjustable to vary the pressure differential in conjunction with an adjustable spring loaded mechanical linkage for determining the pressure set point.

16 Claims, 6 Drawing Figures

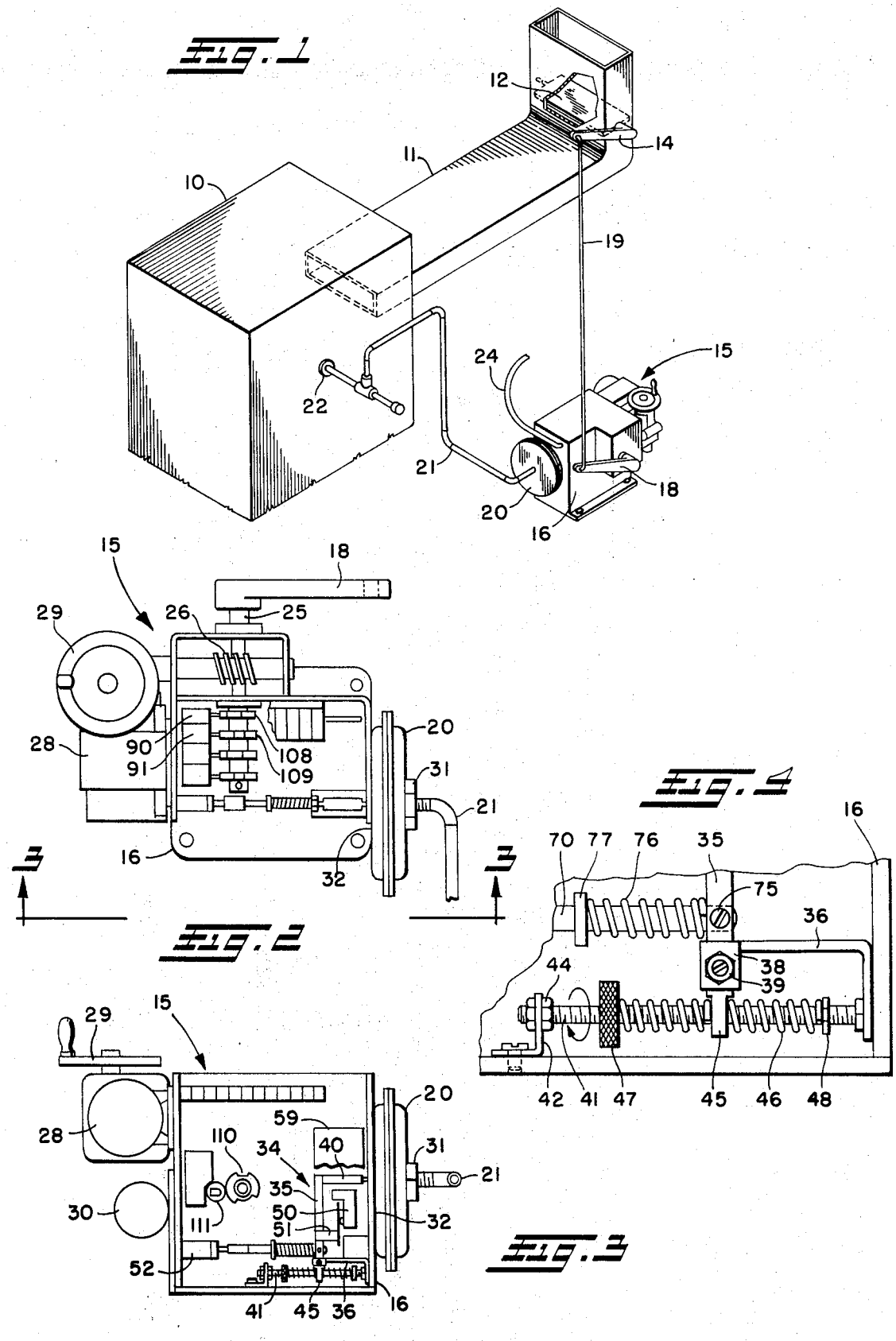

VARIABLE POWER ACTUATOR AND SWITCH THEREFOR

BACKGROUND OF THE INVENTION

This invention relates to control systems for incinerators, dust and fume removal apparatus and the like and more particularly to actuator apparatus for controlling the dampers, louvers, or other draft regulators to maintain desired pressure levels.

Regulator apparatus of this type is well known in the art and one type is referred to as a modulating draft controller wherein it is desired to maintain accurate control over, for example, the positioning of a pressure determining element as a function of such pressure so that suitable standards may be maintained for operation of a scrubber, combuster, waste destructor and the like to assure efficient and reliable operation.

Due to the fact that this equipment may operate on a continuous basis and is often used in environments where control over exhaust fumes or the like is desired, it is essential that the equipment consume minimal amounts of power, operate reliably and consistently as well as perform an optimum regulating function to maintain desired pressure levels within predetermined differentials of operation. Further in order to have such equipment compatible with a wide variety of devices of this type it is necessary to provide adjustments therefor so that the equipment is easily installed or maintained and so that corrective procedures can be facilitated.

The AC type of induction motor is a standard for high reliability for applications of this type, however, reversal of such motor, required for a modulating type of controller, is not readily effected and in the past it has been common to employ electro-mechanical types of relay devices which are a common source of failure, subject to burn-out, contact making failure and the like especially when exposed to environments where harsh or corrosive contaminants may be prevalent. Further it is known to employ conventional types of switching devices for providing end limit functions, pressure differential ranges and the like and it is usually necessary to fabricate specialized apparatus for providing compatibility for such components and for providing some degree of variation of same.

SUMMARY OF THE INVENTION

Therefore it is one object of this invention to provide improved actuator apparatus which is more reliable and more efficient than known prior art devices.

It is another object of this invention to provide improved actuator apparatus which employs a solid state control for motor drive purposes, obviating the shortcomings of conventional mechanical relays and the like.

It is still another object of this invention to provide improved actuator apparatus having adjustment for operating pressure level and pressure differential range, conveniently available for the operator.

It is yet another object of this invention to provide improved actuator apparatus having a single pressure differential switch which is adjustable to provide a selection of the pressure range of operation.

It is a further object of this invention to provide an improved switch especially suited for monitoring pressure levels in actuator apparatus.

It is a still further object of this invention to provide novel circuit apparatus for controlling the running and reversing of an AC motor in response to mechanical switching.

These and other objects are realized in the instant invention which comprises actuator apparatus having a diaphragm exposed to a chamber in which pressure is to be controlled, such chamber having a damper, louver or other device which is to be modulated. Distension of the diaphragm is translated to linear movement of mechanical linkage, the extent of such motion being varied by a spring biasing arrangement, with the linkage in turn serving to actuate the movable contact of a single pole, double throw switch which is adjustable in stroke to define the pressure differential limits. Making of either contact of the switch energizes a solid state relay pack to drive an induction motor in a forward or reverse direction, the motor in turn driving a shaft coupled to the damper device. The shaft includes cams thereon which cooperate with microswitches to provide mechanical end limit control over damper stroke, the response capabilities of the apparatus being sufficiently fast to accommodate virtually all chamber pressure variations. The solid state relay pack employs a pair of SCR and bridge rectifier combinations and is energized directly from the AC source of power.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

In said annexed drawings:

FIG. 1 is an environmental view of a typical incinerator adapted for damper modulation by the apparatus of the instant invention;

FIG. 2 is a plan view partly in cross section of the actuator assembly;

FIG. 3 is an elevational view partly in cross section of the actuator assembly;

FIG. 4 is an elevational view of a portion of the actuator assembly showing the pressure set point apparatus;

DESCRIPTION OF THE PREFERRED EMBODIMENT

Figure 5:
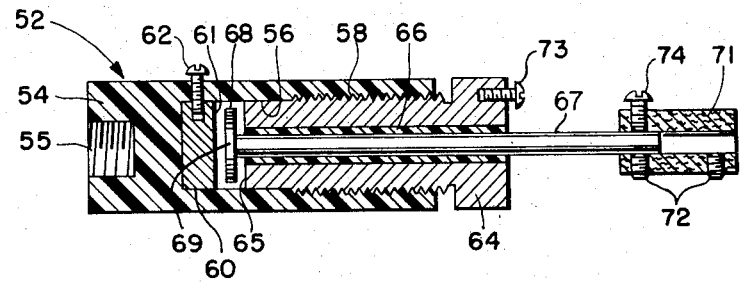
FIG. 5 is a sectional view of the switch for setting the pressure differential.

Referring now to the environmental view of FIG. 1, there is shown a typical incinerator 10 having an exhaust vent 11 thereon, this being but one type of device to which the teachings of this invention are applicable. The incinerator 10 includes a substantially closed chamber therein communicating with the exhaust vent 11 and it is typical to encounter a relatively high pressure level therein due to the combustion process thereby effecting the discharge of gases through the exhaust vent.

A control damper 12 being in its simplest form a rectangular sheet of metal is pivotally supported in the exhaust vent 11 and is positionable therein by means of a control lever 14 thereby to control the pressure levels encountered in the incinerator chamber. The draft controller or actuator apparatus of the instant invention is shown generally at 15 comprising a housing 16 having an actuator lever 18 external thereto which is connected to the control lever 14 for the damper 12 by means of a rod 19 so that the positioning of the actuator lever 18 will be faithfully reproduced in the position of the damper 12. The actuator 15 includes a diaphragm assembly 20 therein for monitoring the pressure in the incinerator 10 and connection is made therebetween by means of suitable pipe 21 terminating in a sampling connection 22 at the incinerator 10. While the pipe 21 is indicated as connected to the incinerator chamber it will be appreciated that the pressure in the exhaust vent 11 anywhere prior to the control damper 12 could be monitored as well and that many other variations are possible with this invention. An electrical conduit 24 is also indicated leading to the actuator 15, this conduit supplying conventional AC power on the order of 120/220 volts, 60 Hz.

Referring now to FIGS. 2 and 3 the actuator 15 is more clearly seen to comprise a box-like housing 16 having a shaft 25 journalled for rotation therein, such shaft 25 extending outside the housing and having the actuator lever 18 secured thereto by means of a set screw or the like. Positioning of the shaft 25 and thus the lever 18 is effected through a worm drive 26 recieving power from a drive motor 28 mounted on the exterior of the housing 16. A hand wheel 29 is provided for moving the worm drive 26 in the event of power failure. Further mounted on the exterior of the housing 16 is the motor capacitor 30 to be described in greater detail hereinafter.

The diaphragm assembly 20 is a commercially available item and is mounted on one end of the housing 16, communicating with the interior thereof by a suitable aperture. The diaphragm 20 includes a pressure connection 31 thereon which is connected to the pipe 21 described with reference to FIG. 1 for monitoring the pressure levels in the chamber to be controlled. For purposes of this description it will be assumed that a distensible wall 32 of the diaphragm 20 moves inwardly toward the interior of the housing 16 for increases in pressure in the diaphragm 20 and is sufficiently resilient to return to an initial position following reduction of pressure.

A linkage mechanism 34 comprising a substantially vertical link 35 is slidably mounted on angle bracket 36 affixed to the housing 16, being retained in place by guide plates 38 in turn secured by nuts 39, as shown in FIG. 4. The linkage includes a rigidly attached horizontal link 40 at the upper portion, having an extension abutting the distensible wall 32 of the diaphragm 20. A bolt 41 is mounted in a horizontal position in a bracket 42 beneath the linkage 34, being secured by nuts 44 and in engagement with the angle bracket 36. The lower portion of the vertical link 35 of the linkage 34 terminates in a fork 45 which straddles the bolt 41 and is inserted between the coils of a spring 46 circumscribing the bolt 41 and retained in position by means of nuts 47, 48 threaded on the bolt. Nut 47 is knurled and may be rotated on the bolt 41 to compress the spring 46 and thus vary the bias on the vertical link 35 of the linkage assembly.

Thus, it will be clear that the linkage 34 is capable of sliding movement on the angle bracket 36 to the left or right as viewed in FIGS. 2-4 through the action of the distensible wall 32 of the diaphragm 20 acting upon the horizontal link 40. Pressure variations in the diaphragm 20 are realized as linear movement of the linkage 34, the extent of movement being proportional to the pressure levels attained. Initially the knurled nut 47 is located to produce sifficient bias upon the vertical link 35 to urge the linkage 34 against the distensible wall 32 of the diaphragm and further compression of the spring 46 will vary the extent of linear movement of the linkage 34 for the various pressure levels encountered in the diaphragm, thereby providing a means for determining and adjusting the pressure set point for the actuator apparatus. A low draft control microswitch 50 is mounted on the housing 16 having a leaf in abutment with a horizontal leg 51 of the linkage 34 to provide electrical sensing for a minimal pressure level encountered in the diaphragm 20.

A special switch 52 however is provided for monitoring the higher pressure levels and for determining the pressure differential for control of the actuator lever 18. Such switch 52 is shown in more detail in FIG. 5 and consists of a cylindrical nylon body 54 threaded at one end 55 for mounting to the housing 16 by means of a screw and having a stop bore 56 with partial threads 58 therein at the other end. The switch body 54 is horizontally mounted in the housing 16 and is adapted to monitor the end limits of movement of the linkage 34 thereby to control the direction of rotation of the motor 28 and thus the position of the actuator lever 18 by way of the solid state relay pack 59, in turn receiving power by way of the electrical conduit 24.

A brass disk 60 forming a fixed swtich contact 61 is secured in the end of the stop bore 56 and is provided with an external electrical connection by means of a screw 62 threaded through the body of the switch into the disk 60. A brass bolt 64, provided with an external electrical connection by means of a screw 73 threaded into the brass bolt, is threaded into the bore 56 of the switch body and has an end 65 forming the adjustable contact positionable a selectable distance from the brass disk 60. The bolt 64 is centrally bored and receives therein a stainless steel rod 67 being slidably supported by an insulating nylon sleeve 66. A brass disk 68 is secured to the rod 67 at the end intermediate the first and second contacts 61, 65 and serves as the movable contact 69 for the switch, capable of abutment with the fixed contact 61 when moved to the furthermost left position and with the adjustable contact 65 when moved to the right, passing through a stroke or throw between the contacts 61, 65 where no electrical connection is made, thereby acting as a single pole, double throw switch having an open intermediate position.

The switch rod 67 is attached to an extension arm 70 of the linkage 34 by means of an insulating fiber sleeve 71 secured by screws 72, a further screw 74 being threaded through the sleeve 71 into abutment with the rod 67 to serve as an electrical terminal for the movable contact 69 of the switch. The extension arm 70 is pivotally mounted to the vertical link 35 of the linkage by means of a screw 75 and is firmly retained in place by means of a spring 76 acting between a flange 77 thereon and the vertical link 35 to preclude backlash in the connection.

Thus, as the diaphragm wall 32 and linkage 34 move to the left evidencing an increase in pressure to a predetermined maximum level, the movable contact 69 of the switch 52 will abut the fixed contact 61 causing energization of the solid state relay pack 59 and thus of the motor 28 causing movement of the damper 12 to a position where the pressure in the incinerator 10 is relieved. The resultant return of the diaphragm wall 32 to the right will cause separation of the movable contact 69 from the fixed contact 61 by way of the linkage 34 thereby deenergizing the motor 28 and stabilizing the damper 12 in the now adjusted position. Such action can continue for further pressure increases or alternatively upon pressure decrease movement of the movable contact 69 of the switch toward the right will continue until abutment is realized with the adjustable contact 65 of the switch to complete a circuit to the solid state relay pack 59 causing rotation of the motor 28 in the reverse direction and thus positioning of the damper to a more closed position in a similar manner.

It will be clear that by adjusting the depth of penetration of the brass bolt 64 in the switch body 54, the separation between the fixed contact 61 and adjustable contact 65 can be varied thereby changing the differential of operation of the actuator for ease of adjustment in the field to eliminate hunting or oscillation. Further it will be clear that such differential is dependent upon the pressure set point level determined by the knurled knob 47 affecting the pressure level at which the switch contacts are operable.

Figure 6:
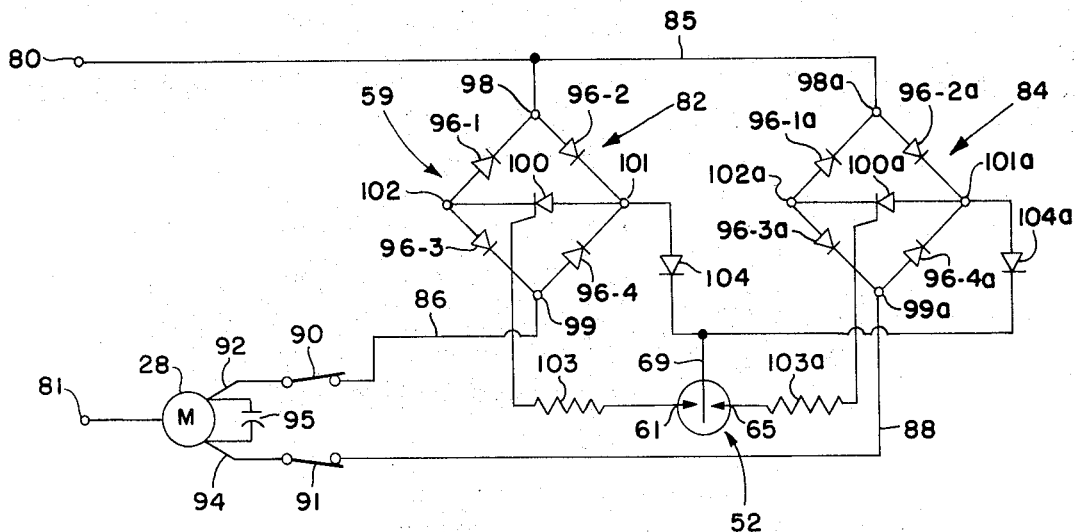
FIG. 6 is a schematic diagram of the solid state relay pack circuit.

Referring now to the FIG. 6 showing of the preferred embodiment of the solid state relay pack 59 there is shown a pair of terminals 80, 81 adapted for receipt of power from the electrical conduit 24, this being the conventional AC power. Such power is adapted for application to the motor 28 by way of a pair of SCR and bridge rectifier switching combinations 82, 84, each combination being selectively energized by the closure of the switch 52, the latter being responsive to the movement of the pressure diaphragm 20 as previously described.

Input power from terminal 80 is applied by way of line 85 to the switching combinations 82, 84, a circuit to the motor being completed by way of line 86 or line 88 through normally closed limit switches 90, 91 respectively, which control the limits of movement of the output shaft 25.

The motor 28 is preferably a split phase AC motor having a pair of input terminals 92, 94 with the phase windings physically displaced to develop a rotating magnetic field therein upon application of power to one input terminal and a phase shifted source of power to the second input terminal. Such connection is established by a non-polarized capacitor 95 connected between the input terminals 92, 94 thereby developing a forwardly or backwardly rotating magnetic field in the motor 28 depending upon which input terminal receives direct energization.

The rectifier switching combinations 82, 84 are identical and each comprises four diodes 96-1 to 96-4 and 96-1a to 96-4a connected in bridge configuration with one terminal 98, 98a connected to line 85 and a second terminal 99, 99a connected respectively to line 86 and line 88 for application of power to the motor 28. An SCR 100, 100a (silicon controlled rectifier) is connected across the diagonal of the bridge rectifier between remaining terminals 101, 102, 101a, 102a. The gate electrode of the SCR 100 is connected by way of a current limiting resistor 103 to the fixed contact 61 of the switch 52 while the gate electrode of the second SCR 100a is connected by way of a second resistor 103a to the adjustable contact 65 of the switch. A pair of diodes 104, 104a are employed for supplying energization of the switch 52 having anodes connected to the terminals 101, 101a of the rectifier combinations 82, 84 and having a common cathode connection to the movable contact 69 of the switch 52.

Thus in the position of the switch 52 shown in FIG. 6, neither of the rectifier combinations 82, 84 will be energized inasmuch as no gate current is supplied to either of the SCR's 100, 100a. When, for example, the movable contact 69 of the switch 52 is moved to abut the fixed contact 61 due to a pressure increase in the diaphragm 20, gating current will be supplied to the SCR 100 from the power source by way of diodes 96-2, 104 and the resistor 103 or on the alternate half cycles by way of the motor winding, the diodes 96-4, 104 and the resistor 103 to cause conduction of the SCR 100. Full wave current will be supplied to the motor 20 by way of diode 96-2, the SCR 100 and diode 96-3 and on the alternate half cycles by way of the diode 96-4, SCR 100 and diode 96-1 with the SCR 100 conducting the full wave of current. Such conduction will continue so long as gating current is supplied to the SCR 100, such current being discontinued upon the opening of the switch contacts 61, 69 in response to a decrease in pressure in the diaphragm 20.

A similar operation obtains in the second rectifier switching combination 84 upon abutment of the movable contact 69 with the adjustable contact 65 of the switch 52 now supplying power by way of line 88 to the second terminal of the motor 28, phase shifting being developed through the capacitor 95 to cause the opposite direction of rotation. The diodes 96 and SCR's 100 in this embodiment of the invention are preferably silicon semi-conductor devices having appropriate ratings to carry relatively heavy current through the motor windings and the lesser current required for gating purposes.

Such operation is typical and in most instances is sufficient for modulation of the damper 12 position. Suitable safeguards are provided however to accommodate unusual pressure conditions or to provide end limits of movement for the actuator lever 18 and thus the damper 12.

The limit switches 90, 91 are conventional microswitches supported in the housing 16 in a position to cooperate with respective cams 108, 109 mounted on the actuator shaft 25 for rotation therewith. The cams 108, 109 are adjustably mounted and may be positioned so that notches 110 therein define the angular limits of rotation of the shaft 25, allowing release of the respective rollers 111 of the switches 90, 91, thereby creating an open condition for the appropriate switch.

As noted in FIG. 6, the switches 90, 91 are in series connection with the motor 28 and when open will prevent further energization of same in that direction. Such condition can be overcome by a change in the pressure monitored by diaphragm 20 causing closure of the switch 52 for energization of the motor 28 in the opposite direction, inasmuch as only one of the switches 90, 91 will be in an open condition or alternatively repositioning of the shaft 25 can be effected through handwheel 29, if manual control is desired or necessary. When both switches 90, 91 are again closed, normal operation of the actuator will ensue under control of switch 52.

The embodiments of the invention in which an exclusive property of privilege is claimed are defined as follows:

1. Actuator apparatus comprising a housing, a shaft supported in said housing, a motor for positioning said shaft, a diaphragm supported in said housing, said diaphragm adapted for distension in response to pressure variations, switch means for monitoring movement of said diaphragm, linkage means coupling said switch means and said diaphragm, and relay means responsive to said switch means for connecting said motor to a source of power for controlling position of said shaft, said switch means comprising a single pole double throw switch for controlling said relay means at high and low pressure levels to drive said motor in forward and reverse directions, and said switch comprising spaced first and second contacts and a third cooperable contact movable therebetween through a noncontacting stroke, said third contact being operatively connected to said linkage means thereby to determine operation at a pressure differential, and said first contact being adjustable relative to said second contact to vary the pressure differential range.

2. Apparatus as set forth in claim 1 wherein said linkage means comprises a lever interconnecting said diaphragm and said switch means, and spring means biasing said lever to control movement of the latter.

3. Apparatus as set forth in claim 2 wherein said spring means is adjustable to control the set point for pressure levels where said switch means is actuable.

4. Apparatus as set forth in claim 1 further including spring means biasing said linkage means to control the position of the latter at various pressure levels, thereby controlling the pressure level set point for actuation of said switch.

5. Apparatus as set forth in claim 4 wherein said spring means is adjustable to vary the pressure level settings.

6. Apparatus as set forth in claim 8 wherein said linkage means comprises a lever mechanism interconnecting said third contact and said diaphragm, said spring means comprising a spring engaging a portion of said lever mechanism, and means for adjusting the bias of said spring.

7. Apparatus as set forth in claim 1 wherein said relay means comprises solid state switching means operatively connected with said switch means and operative to connect said motor for forward and reverse actuation.

8. Apparatus as set forth in claim 7 wherein said switching means comprises a pair of SCR and bridge circuit combinations; each said combination being operative to connect said motor for actuation in a single direction.

9. Apparatus as set forth in claim 8 wherein said motor is a split phase motor energizable from an AC source of power, each said combination being in series connection with one of the phase windings of the motor, said motor further including a capacitor in connection between said phase windings.

10. Apparatus as set forth in claim 1 wherein said shaft is adapted for positioning the draft controller of apparatus having a chamber therein subject to varying pressure conditions, said diaphragm being operatively connected with said chamber for sensing pressure levels therein.

11. Apparatus as set forth in claim 1 wherein said switch comprises means for monitoring limits of linear movement comprising a body member having a stop bore therein, said first contact located at the closed end of said stop bore, means received in said stop bore for supporting said second contact for linear movement relative to said first contact, and means for connecting said first and second contacts to said motor, said connecting means being accessible externally of said body member.

12. A switch as set forth in claim 11 wherein said supporting means comprises said third contact disposed in the path of movement of said second contact, said supporting means insulatively supporting said second contact.

13. A switch as set forth in claim 12 wherein said supporting means comprises a tubular member threadedly received in said body member and adapted for adjustable threading therein for variable positioning of said third contact relative to said first contact.

14. A switch as set forth in claim 13 wherein said supporting means comprises a conductive rod insulatively supported for linear movement in said tubular member and said tubular member is formed of conductive material.

15. A switch as set forth in claim 14 wherein said body member comprises a nylon cylinder having a threaded bore at one end.

16. Apparatus for energizing a motor having first and second windings for forward and reverse rotation from an AC source of power, comprising a pair of bridge rectifiers, each said bridge rectifier in series connection with one of said windings of said motor and said AC source of power, a pair of SCR's, each said SCR being in diagonal connection in one of said bridge rectifiers to conduct full wave current flow when triggered, a capacitor in connection between said first and second windings of said motor, switch means for selectively triggering said pair of SCR's, said switch means being adapted for interconnecting the gate electrodes of said SCR's with said source of power, each said SCR being connected to first and second terminals of said respective bridge rectifiers, and further including a pair of diodes, each said diode connecting said first terminal of said bridge rectifier to said switch means.

* * * * *